United States Patent [19]
Lee et al.

[11] Patent Number: 5,929,994
[45] Date of Patent: Jul. 27, 1999

[54] INTERGRATING SPHERE ELLIPSOMETER

[75] Inventors: Hsiao-Wen Lee; Chih-Kung Lee, both of Taipei; Yun-Chang Yang, Chungho, all of Taiwan

[73] Assignee: Ahead Optoelectronics, Inc., Taipei, Taiwan

[21] Appl. No.: 09/081,273

[22] Filed: May 20, 1998

[51] Int. Cl.⁶ .................. G01J 4/00; G01J 1/04; G01J 1/00
[52] U.S. Cl. .............. 356/364; 356/236; 356/369; 250/228
[58] Field of Search ...................... 356/236, 364, 356/369, 446, 73, 381, 382; 250/228

[56] References Cited

U.S. PATENT DOCUMENTS 4,873,430  10/1989  Juliana et al. ..................... 356/382
5,757,671  5/1998  Drevillon et al. ................... 356/369

*Primary Examiner*—Robert H. Kim
*Assistant Examiner*—Amanda Merlino
*Attorney, Agent, or Firm*—Staas & Halsey

[57] ABSTRACT

An integrating sphere ellipsometer includes an incident light polarization control unit, a reflective light polarization analysis unit, an integrating sphere and a total integrated scattered light detector. The incident light polarization control unit and the reflective light polarization analysis unit jointly function as an ellipsometer to obtain information such as film thickness and material complex refractive indices. Concurrently, the identical incident light polarization control unit, the total integrated scattered light detector and the integrating sphere unite to function as an integrating sphere analyzer to measure material defects, surface roughness, surface particulates, micropollutants, etc.

17 Claims, 5 Drawing Sheets

INTERGRATING SPHERE ELLIPSOMETER

BACKGROUND OF THE INVENTION

1. Field of the Invention

The present invention relates to an ellipsometer, more particularly, to an ellipsometer combined with an integrating sphere to measure film thickness, material complex refractive indices, micro root-mean-square surface roughness, surface particulates, bulk particulates, micropollutants, and sub-surface defects of testpieces through multiple incident angles.

2. Description of Related Art

Quality monitoring and control of film thickness, material complex refractive indices, micro root-mean-square roughness, surface particulates, bulk particulates micropollutants, and sub-surface defects are very important issues for semiconductor fabrication, liquid crystal display manufacturing, film coating and disk drive manufacturing. In the semiconductor or disk drive fabricating process, measuring film thickness is effected by utilizing an ellipsometer, while detecting surface conditions is effected by utilizing a microscope. Alternatively, other contacting or non-contacting measuring methods can also be used. However, identifying defects requires utilizing special purpose instruments specifically to detect the defect. In addition, the surface evenness of a semiconductor wafer can only be measured by selectively detecting on the wafer itself.

As high-density integrated circuits such as 256M DRAM are developed, even very small defects (e.g. 20 nm) may cause current leakage and degradation in the quality of the film. As such, it is essential to improve the instruments used in measuring the thickness and quality of the film.

SUMMARY OF THE INVENTION

One objective of the present invention is to provide an integrating sphere ellipsometer, which is a combination of an ellipsometer and an integrating sphere analyzer. The ellipsometer and the integrating sphere analyzer both use an identical incident light polarization control unit to provide incident light. The integrating sphere ellipsometer functions to measure film thickness, material complex refractive indices, micro root-mean-square roughness, surface particulates, bulk particulates, micropollutants, and sub-surface defects of testpieces simultaneously with multiple incident angles.

Another objective of the present invention is to provide an integrating sphere ellipsometer which can rapidly and accurately perform a full domain scan to quickly obtain full surface characterization.

In accordance with one aspect of the present invention, the integrating sphere ellipsometer comprises an incident light polarization control unit, a reflective light polarization analysis unit, an integrating sphere and a total integrated scattered light detector. The incident light polarization control unit and the reflective light polarization analysis unit cooperatively functions as an ellipsometer to obtain information such as film thickness and material complex refractive indices. Concurrently, the same incident light polarization control unit, the total integrated scattered light detector and the integrating sphere jointly function as an integrating sphere analyzer to measure material defects, surface roughness, surface particulates, micropollutants, etc.

In accordance with another aspect of the present invention, the integrating sphere ellipsometer utilizes a phase modulator in the incident light polarization control unit to continuously adjust phase retardation or perform a triple phase shift to quickly obtain an elliptical function.

Other objectives, advantages and novel features of the invention will become more apparent from the following detailed description when taken in conjunction with the accompanying drawings.

DETAILED DESCRIPTION OF PREFERRED EMBODIMENT

An integrating sphere ellipsometer in accordance with the present invention is composed of a combination of an ellipsometer and an integrating sphere analyzer.

Figure 1:
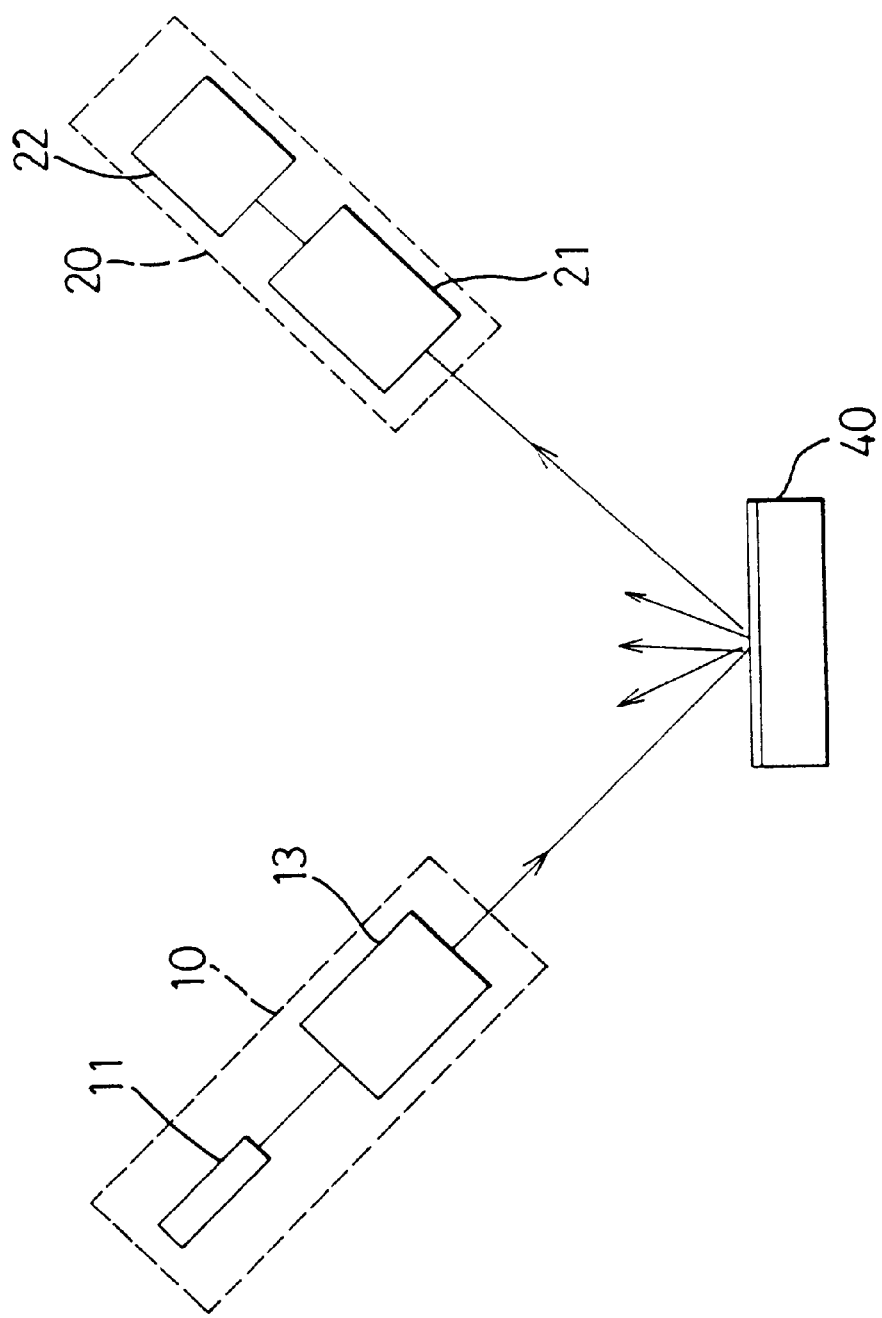
FIG. 1 is a schematic diagram showing an embodiment of an ellipsometer of an integrating sphere ellipsometer in accordance with the present invention.

Referring to FIG. 1, the ellipsometer comprises an incident light polarization control unit 10 having a light source 11 and a phase modulator 13, and a reflective light polarization analysis unit 20 possessing a polarization analyzing plate 21 and a light detector 22. The phase modulator 13 of the incident light polarization control unit 10 is used for controlling a polarized state of incident light projected onto a testpiece 40.

The light source 11 can be a laser, alternatively, a Xenon (Xe) lamp or a white light source with a monochromator for setting a wavelength bandwidth of the light source. The light detector 22 can be a photodiode, a photodiode array, a charged coupled device (CCD) image sensor, a CMOS image sensor, or a spectrometer, wherein the spectrometer can be a grating combined with a photodiode, a photodiode array a CCD image sensor, or a CMOS image sensor.

Figure 2:
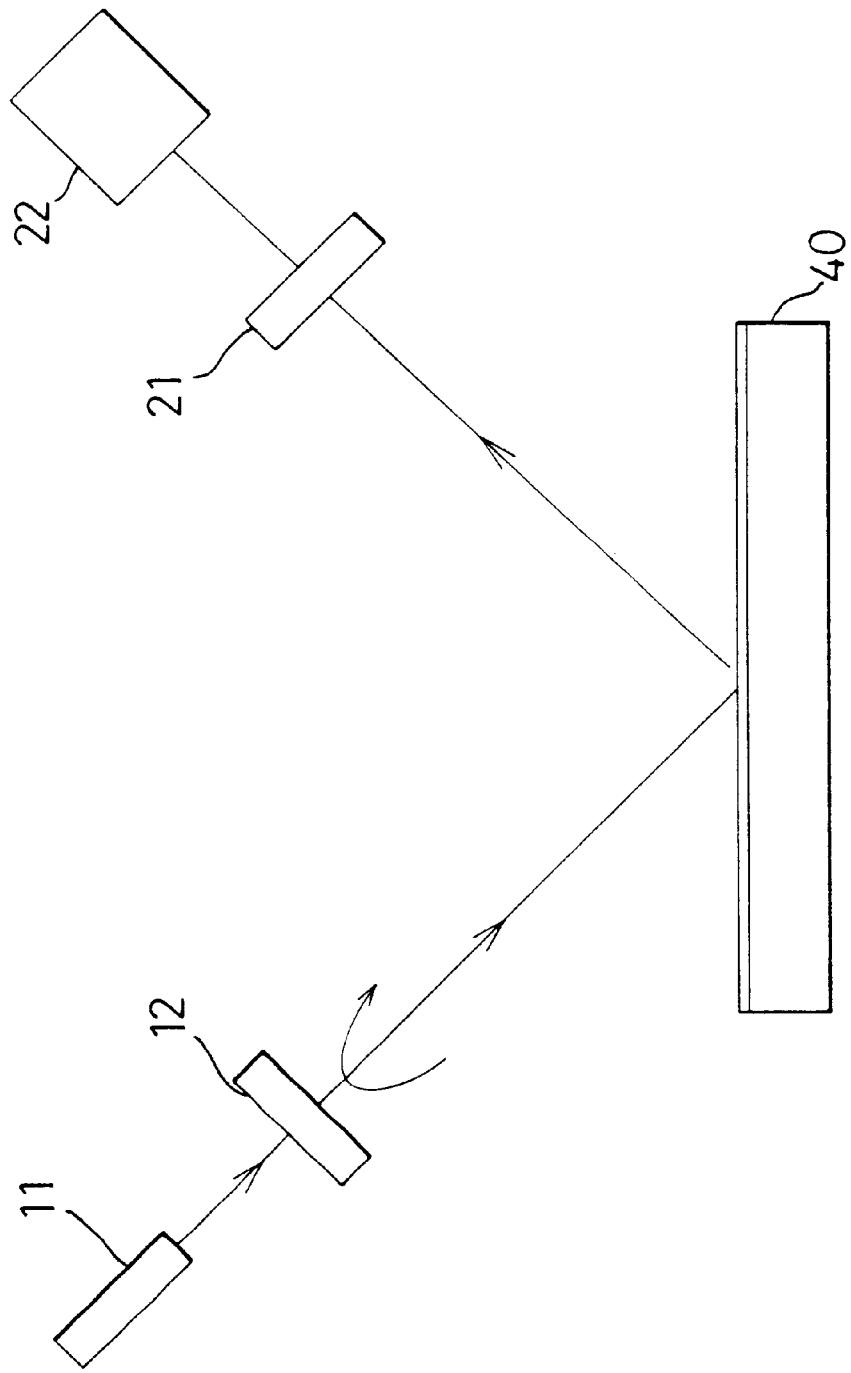
FIG. 2 is a schematic diagram showing another embodiment of an ellipsometer of an integrating sphere ellipsometer in accordance with the present invention.

Alternatively, the incident light polarization control unit 10 comprises a light source 11 and a rotational polarizing plate 12a instead of the phase modulator 13, as shown in FIG. 2. The incident light polarization control unit 10 can also be composed of the light source 11, a polarizing plate 12 and a photoelastic birefringence modulator 13a (FIG. 3) wherein the photoelastic birefringence modulator 13a can be substituted by a liquid crystal phase modulator, an ADP crystal phase modulator or a phase modulator of any other type.

The polarization analyzing plate 21 (FIG. 1) of the reflective light polarization analysis unit 20 can be substituted with a rotational analyzing plate (not shown).

The incident light angle of the incident light polarization control unit 10 and accordingly the corresponding reflective angle of the reflective light polarization analysis unit can be varied as required, or fixed to be constant.

Referring to FIG. 1, light from the light source 11 is projected to testpiece 40. The reflective light reflected from the testpiece 40 is received by a light detector 22 through the polarization analyzing plate 21. The light detector 22 then transmits information to a computer system so that an elliptical function can be obtained. From the elliptical function, film thickness and material complex refractive indices can then be calculated.

Figure 4:
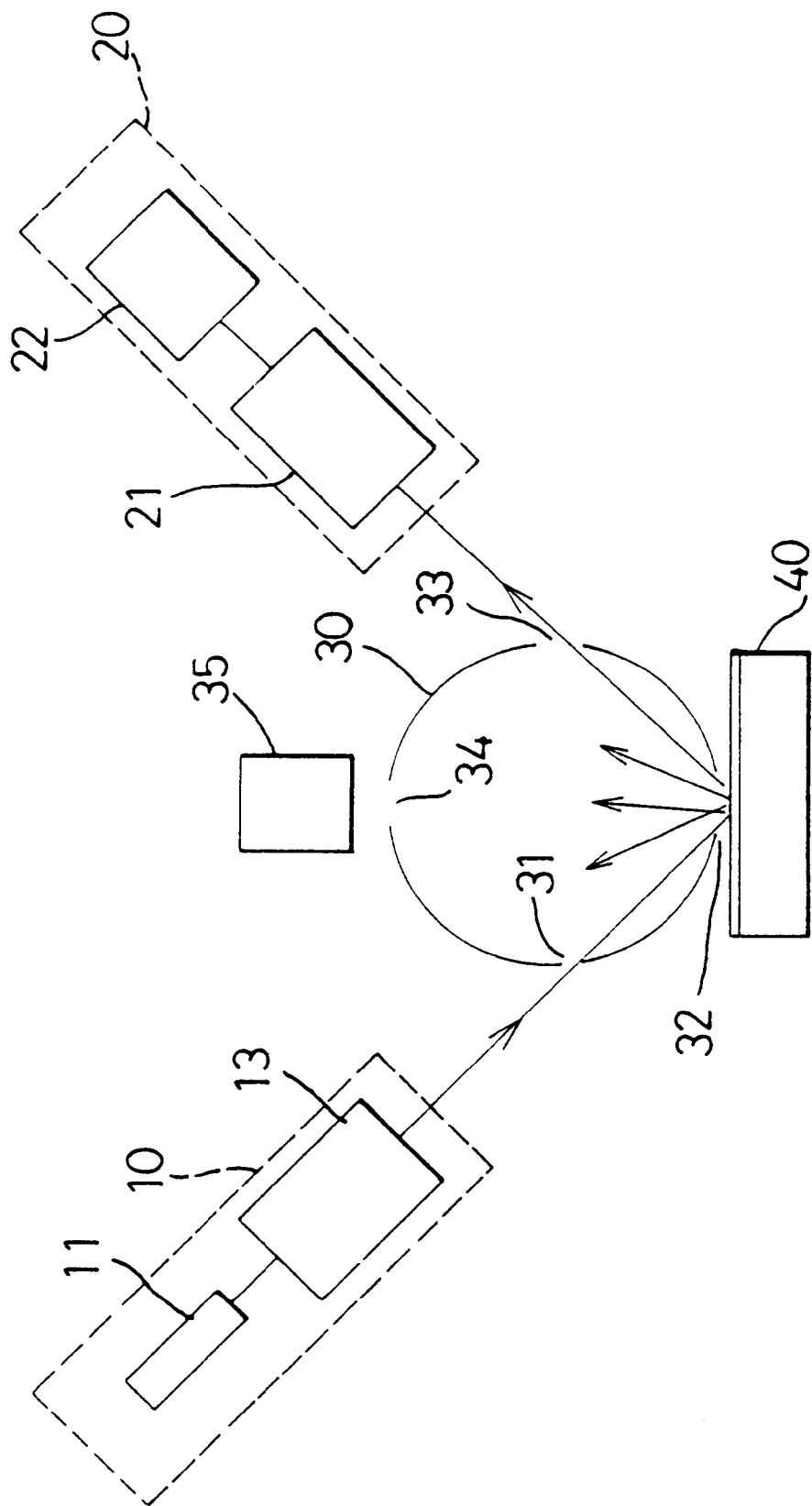
FIG. 4 is a schematic diagram showing another embodiment of an integrating sphere ellipsometer in accordance with the present invention.

The integrating sphere analyzer is composed of incident light polarization control unit 10, an integrating sphere 30 and a total integrated scattered light detector 35. Referring to FIG. 4, a combination of the ellipsometer and the integrating sphere analyzer is shown.

The integrating sphere 30 has an incidence port 31, a testpiece port 32, a reflection port 33 and a scatter port 34. The four ports 31–34 are positioned respectively corresponding to the incident light polarization control unit 10, the testpiece 40, the reflective light polarization analysis unit 20 and the total integrated scattered light detector 35. More specifically the position of the incidence and reflection ports on the integrating sphere can be adjusted in-situ to accommodate the angle of incidence for the ellipsometer.

It is seen that the incident light reaches the location of testpiece 40 via incidence port 31 and testpiece port 32. The reflective light reflected from testpiece 40 includes a specular reflective light and scattered light. Based on Snell's law, a reflection angle is equal to an incident angle and as such the specular reflective light is accordingly reflected out of reflection port 33 of integrating sphere 30 and enters reflective light polarization analysis unit 20.

The scattered light due to the roughness of the surface of testpiece 40 is spatially integrated throughout the integrating sphere 30, whereby a total integrated scatter (TIS) is obtained. The TIS is calculated by using the output from scatter port 34 of integrating sphere 30, detected by the total integrated scattered light detector 35 and the output from reflection port 33 of integrating sphere 30, detected by the detector 22. More specifically, the relationship is stated as:

$$TIS = \frac{I_s}{I_r} = \left(\frac{4\pi\sigma\cos\theta}{\lambda}\right)^2,$$

where:

$I_s$: scattered light intensity
$I_{sp}$: specular reflection intensity
$I_r = I_{sp} + I_s$: total reflected intensity
TIS: total integrated scatter
$\theta$: angle of incidence
$\lambda$: wavelength
$\sigma$: root-mean-square surface roughness Material defects, surface micro-roughness, surface particulates and micropollutants can cause the incident light to be scattered. Spatial distribution of the scattered light is related to the incident light polarization, optical characteristics of the material, surface profile and incident angle, and as such can be determined through analysis using a vector scatter theory.

In addition, an evident relationship exists between the spatial distribution of the scattered light and the power spectral density function of the surface micro-roughness. This relationship can be described by a relational expression. However, to obtain the power spectral density function from the spatial distribution of the scattered light by an inverse operation, a calculation of this type is very complicated and time-consuming. However, a root-mean-square surface roughness can be easily measured and can sufficiently indicate the characteristics of the surface. Therefore, the present invention intends to determine the root-mean-square surface roughness.

Even a polished wafer has a root-mean-square surface roughness of several angstroms. The integrating sphere ellipsometer in accordance with the present invention generates a background scattered light signal (haze). When the incident light scans and discovers the surface particulates, bulk particulates, sub-surface defects, etc., one or more surge events occur in the background scattered light signal. Since the duration time and amplitude of the surge event during scanning are related to the size of the particulates, the sub-surface defects and materials, information about the surface particulates, micropollutants and sub-surface microdefects can all be readily obtained by analyzing the surge event(s).

Figure 5:
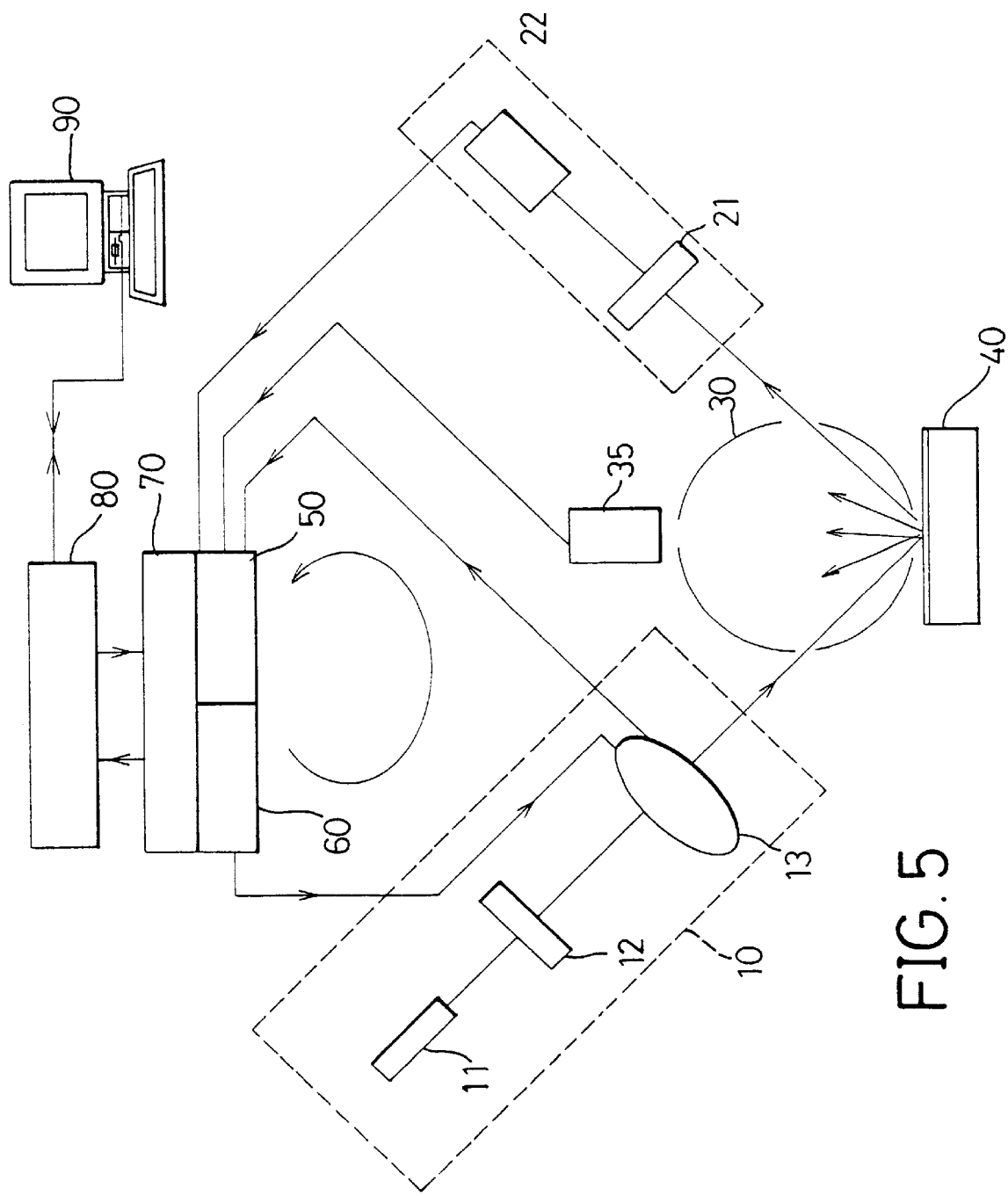
FIG. 5 is a schematic diagram showing another embodiment of an integrating sphere ellipsometer in accordance with the present invention.

Referring to FIG. 5, an embodiment of the structure of the integrating sphere ellipsometer is shown. The incident light polarization control unit 10 comprises light source 11, which is a laser, a polarizing plate 12 and a phase modulator 13. Phase modulator 13 and A/D converter 50 and D/A converter 60 of interface card 70 of computer system 90 form a closed loop, by which phase modulator 13 can perform on-line calibrations. Light detectors 22 and 35 receive the reflective light and scattered light respectively. Light detectors 22 and 35 then send signals to A/D converter 50 for conversion. The converted signals are then analyzed and calculated by means of control program 80 of computer system 90.

One of the methods for the incident light polarization modulation is practiced from p-polarization to s-polarization through circular polarization. Namely, a phase is shifted from the easternmost point (p-polarization) to the westernmost point (s-polarization) via the southernmost point (circular polarization) on a Poincare sphere by utilizing phase shifting techniques. An elliptical function can then be obtained either by continuously adjustable phase retardation or a triple phase shift. In particular, triple phase shift is appropriate for rapid full-domain scanning to obtain the full surface characterization. For example, a first full domain scan is performed by utilizing a rotary platform with a speed of 3000 rpm (50 Hz) with a polarization state, then a second full domain scan is done with another polarization state, and finally, a third full domain scan is completed with a further polarization state. In this way, it is not necessary to modulate the phase point by point, and thus the sampling speed and analyzing speed can be greatly increased.

Figure 3:
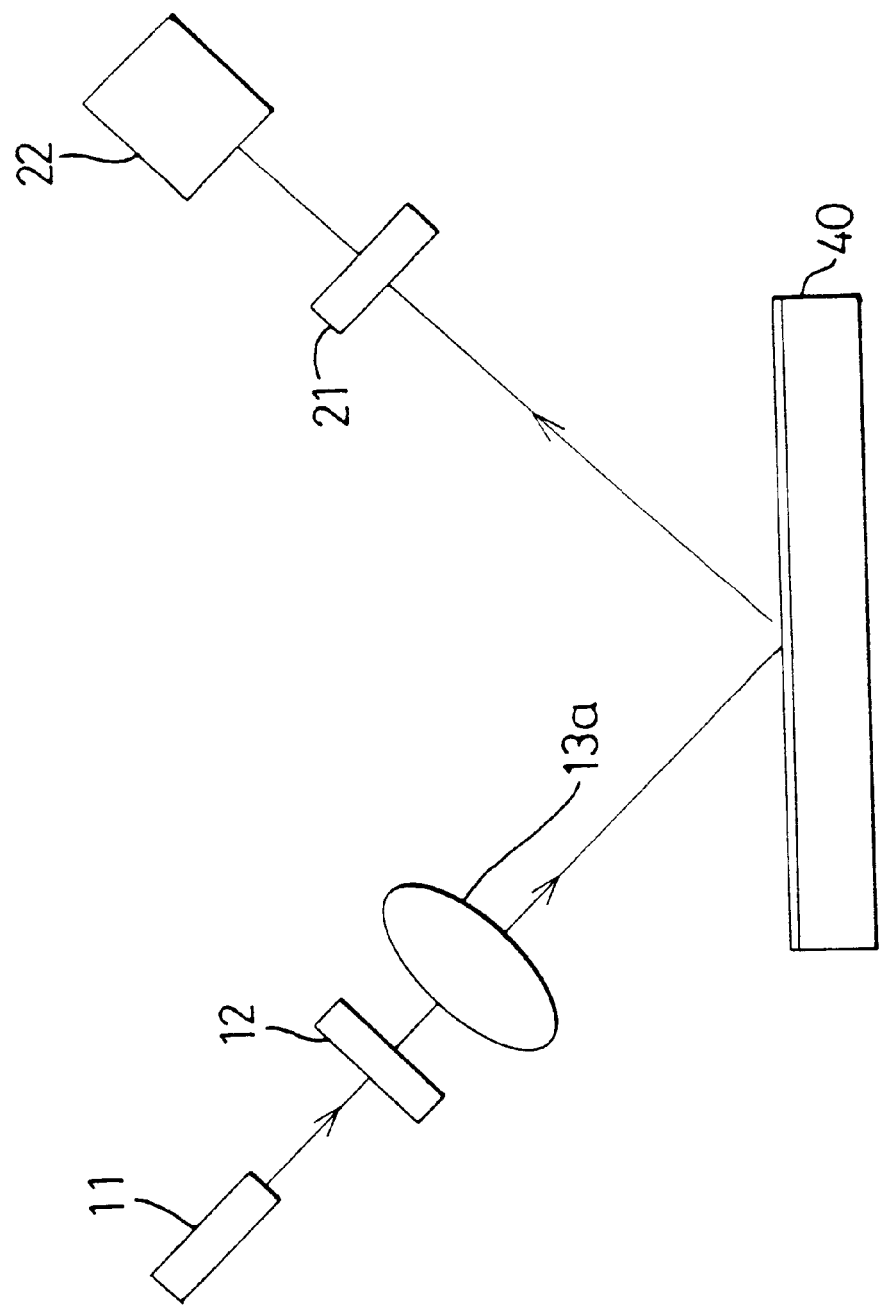
FIG. 3 is a schematic diagram showing a further embodiment of an ellipsometer of an integrating sphere ellipsometer in accordance with the present invention.

Alternatively, the phase modulator 13 is substituted with photoelastic birefringence modulator 13a as shown in FIG. 3. The modulating period of the modulator is separated into a positive phase raising section, a positive phase falling section, a negative phase falling section and a negative phase raising section, and the operation of the modulator is achieved by utilizing phase shift demodulation techniques. Accordingly, the frequency of an output light signal is four times that of the modulating frequency of the modulator. For example, the frequency of the phase shift in accordance with the present invention can achieve 200 kHz when utilizing a photoelastic modulating frequency of 50 kHz. Therefore errors can be reduced when a phenomenon of microinterference due to material defects can be detected.

The methods for measuring film thickness, complex refractive indices, micro root-mean-square surface roughness, surface particulates, micropollutants and sub-surface micro-defects are described as follows:

1. Measurement of Bulk Particulates

First select the polarization state of the incident light to be a p-polarization, the incident angle is selected to be the Brewster angle of the surface of the material. Then conditions are set so that the intensity of the reflective light is at its minimum. In this case, a major part of the incident light transmits through the surface of the material into the inner layer thereof, while a minor part of the incident light is transferred into scattered light because of the roughness of the surface. When the transmitting incident light scans and finds bulk particulates, a surge event signal occurs in the haze signal. The duration time and amplitude of the surge event are related to the dimension of the particulates and material.

2. Measurement of Sub-surface Defects

The conditions are set similarly as in the last case. Under the same operating state, when the transmitting incident light scans and finds a defect such as a crack, one or more surge event signals may occur in the haze signal depends on the ratio of the spot size and the crack size. The duration time, amplitudes and degree of overlap between the two surge events are dependent on the dimensions of the crack and the intensity of the incident light.

3. Measurement of Micro Root-mean-square Surface Roughness

For measuring micro root-mean-square surface roughness, the incident angle is typically selected to be larger than the Brewster angle of the surface of the material to be tested. However, the present invention uses the s-polarization incident light along the Brewster's angle, the incident light will partially penetrate the surface layer and partially reflected/scattered by the surface layer. Comparing the results obtained by this s-polarization incidence configuration with that of the configuration using p-polarization incident light beam along the Brewster's angle, where almost all incident light will penetrate the surface layer, the effect of the micro root-mean-square surface roughness data can be retrieved by the inverse operation of the TIS (total integrated scatter) measured by the integrating sphere analyzer.

4. Measurement of Surface Particulates

The incident angle is selected to be the Brewster angle of the surface of the material, and the polarization state of the incident light is selected to be s-polarization.

First only a homogeneous surface is considered. As previously mentioned, even a polished wafer has a roughness of several angstroms. However, a particulate on the wafer surface will result in a surge signal, whose duration time and amplitude are related to the dimensions of the microparticulate, appeared within the background haze. For a wafer with patterns, it is typically required that the particulates with a dimension of about 1/10 of a wire-width (width of wires in the wafer) be surveyed by a particulate scanner. According to the scatter theory, the transition of a particulate signal is related to the sectional area (or radius square) thereof. Thus, a detecting point of a particulate signal leads to a more rapid transition than a wire-width signal, whereby the existence of the particulates can be determined accordingly.

5. Measurement of Film Thickness and Complex Refractive Indices

After executing the scan under the s-polarization state and p-polarization state, information about micro root-mean-square surface roughness, surface particulates, bulk particulates and sub-surface defects can be obtained. According to principles of phase shift ellipsometry, a circularly polarized light is utilized as the incident light, then elliptical functions can be determined. As such, film thickness and complex refractive indices can be calculated from elliptical functions based on film theory by using one or more incident angles depends on the number of unknowns.

As described above, the present invention provides an integrating sphere ellipsometer by combining an ellipsometer and an integrating sphere analyzer. Utilizing an integrating sphere ellipsometer of the present invention, information about film thickness, complex refractive indices, micro root-mean-square surface roughness, surface particulates, micropollutants and sub-surface defects of testpieces can be simultaneously obtained by using the same incident light.

It should be understood, however, that even though numerous characteristics and advantages of the present invention have been set forth in the foregoing description together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An integrating sphere ellipsometer comprising an ellipsometer and an integrating sphere analyzer, wherein said ellipsometer comprising:

an incident light polarization control unit for generating an incident light with selected and controlled conditions, the incident light being projected onto a testpiece;

a reflective light polarization analysis unit for receiving reflective light reflected by the testpiece and analysis of the reflective light;

and said integrating sphere analyzer comprising:

an incident light polarization control unit for generating an incident light with selected and controlled conditions, the incident light being projected onto a testpiece;

an integrating sphere for spatially integrating scattered light from the testpiece to determine a total integrated scatter (TIS); and a total integrated scattered light detector for receiving and analyzing TIS;

said incident light polarization control unit of the ellipsometer and said incident light polarization control unit of the integrating sphere analyzer being an identical one.

2. The integrating sphere ellipsometer as claimed in claim 1, wherein said ellipsometer possesses the capabilities of varying the incident angle of the incident light polarization control unit and the corresponding reflective angle of the reflective light polarization analysis unit.

3. The integrating sphere ellipsometer as claimed in claim 1, wherein said ellipsometer possesses a fixed incident angle of the incident light polarization control unit and the same fixed reflective angle of the reflective light polarization analysis unit.

4. The integrating sphere ellipsometer as claimed in claim 1, wherein said incident light polarization control unit comprises at least one light source, a polarizing plate and a phase modulator.

5. The integrating sphere ellipsometer as claimed in claim 4, wherein said light source is a laser, a Xenon (Xe) lamp, or a white light source.

6. The integrating sphere ellipsometer as claimed in claim 4, wherein said light source is a Xenon lamp or a white light source with a monochromator for setting the wavelength bandwidth of the incident light source.

7. The integrating sphere ellipsometer as claimed in claim 4, wherein said polarizing plate is a rotary polarizing plate.

8. The integrating sphere ellipsometer as claimed in claim 4, wherein said phase modulator is a photoelastic birefringence modulator.

9. The integrating sphere ellipsometer as claimed in claim 4, wherein said phase modulator is a liquid crystal phase modulator.

10. The integrating sphere ellipsometer as claimed in claim 4, wherein said phase modulator is an ADP crystal phase modulator.

11. The integrating sphere ellipsometer as claimed in claim 1, wherein said reflective light polarization analysis unit comprises an analyzing plate and a light detector.

12. The integrating sphere ellipsometer as claimed in claim 11, wherein said analyzing plate is a rotary analyzing plate.

13. The integrating sphere ellipsometer as claimed in claim 11, wherein said light detector is a photodiode, a photodiode array, a CCD image sensor, a CMOS image sensor, or a spectrometer.

14. The integrating sphere ellipsometer as claimed in claim 13, wherein said spectrometer is a grating combined with a photodiode, a photodiode array, a CCD image sensor, or a CMOS image sensor.

15. The integrating sphere ellipsometer as claimed in claim 1, wherein said integrating sphere comprises an incidence port, a testpiece port, a reflection port and a scatter port, which are positioned respectively corresponding to the incident light polarization control unit, the testpiece, the reflective light polarization analysis unit and the total integrated scattered light detector.

16. The integrating sphere ellipsometer as claimed in claim 15, wherein the positions of the incidence and reflection ports on the integrating sphere can be adjusted in-situ to accommodate the angle of incidence for the ellipsometer.

17. The integrating sphere ellipsometer as claimed in claim 1, further comprising a computer system for analyzing and calculating the data transmitted from said reflective light polarization analysis unit and said total integrated scattered light detector.

* * * * *